(12) United States Patent
Muto et al.

(10) Patent No.: US 9,783,037 B2
(45) Date of Patent: Oct. 10, 2017

(54) VEHICLE

(71) Applicant: HONDA MOTOR CO., LTD., Tokyo (JP)

(72) Inventors: Kenji Muto, Wako (JP); Akira Nakai, Wako (JP); Hideaki Sakai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/636,182

(22) Filed: Mar. 3, 2015

(65) Prior Publication Data

US 2015/0273995 A1 Oct. 1, 2015

(30) Foreign Application Priority Data

Mar. 28, 2014 (JP) .................................. 2014-069219

(51) Int. Cl.
*B60K 1/04* (2006.01)
*H01M 10/42* (2006.01)
(Continued)

(52) U.S. Cl.
CPC .................. *B60K 1/04* (2013.01); *B60L 7/14* (2013.01); *B60L 11/126* (2013.01);
(Continued)

(58) Field of Classification Search
CPC .............. B60K 1/04; B60K 2001/0405; B60K 2001/0416; B60K 2001/0438;
(Continued)

(56) References Cited

U.S. PATENT DOCUMENTS 3,721,947 A * 3/1973 Robin .................. H01R 11/284
439/522
3,989,544 A * 11/1976 Santo ...................... H01M 2/20
429/121
(Continued)

FOREIGN PATENT DOCUMENTS

JP 2003-059541 2/2003
JP 2009-190438 8/2009
(Continued)

OTHER PUBLICATIONS

Japanese Office Action for corresponding JP Application No. 2014-069219, dated Dec. 6, 2016 (w/ English machine translation).

*Primary Examiner* — Frank B Vanaman
(74) *Attorney, Agent, or Firm* — Mori & Ward, LLP (57) ABSTRACT

A vehicle includes a body, a first battery set, a first accessory device, a second battery set, a second accessory device, a load device, and connecting wires. The first battery set is installed in the body and includes at least one first series unit including a predetermined number of battery cells connected in series. The first accessory device is installed in the body and connected to the first battery set. The second battery set is installed in the body and includes at least one second series unit including a predetermined number of battery cells connected in series. The second accessory device is installed in the body and connected to the second battery set. The load device is installed in the body and connected to the first battery set via the first accessory device and to the second battery set via the second accessory device.

21 Claims, 7 Drawing Sheets

(51) Int. Cl.
  *H01M 2/20* (2006.01)
  *B60L 7/14* (2006.01)
  *B60L 11/12* (2006.01)
  *B60L 11/18* (2006.01)
  *H01M 2/10* (2006.01)
  *H01M 10/0525* (2010.01)

(52) U.S. Cl.
  CPC ....... *B60L 11/1803* (2013.01); *B60L 11/1816* (2013.01); *B60L 11/1861* (2013.01); *B60L 11/1864* (2013.01); *B60L 11/1877* (2013.01); *B60L 11/1879* (2013.01); *H01M 2/1083* (2013.01); *H01M 2/206* (2013.01); *H01M 10/4207* (2013.01); *B60K 2001/0416* (2013.01); *B60K 2001/0438* (2013.01); *B60L 2210/10* (2013.01); *B60L 2210/30* (2013.01); *B60L 2220/14* (2013.01); *B60L 2240/547* (2013.01); *B60L 2240/549* (2013.01); *B60L 2270/20* (2013.01); *H01M 10/0525* (2013.01); *H01M 10/425* (2013.01); *H01M 2220/20* (2013.01); *Y02E 60/122* (2013.01); *Y02T 10/6217* (2013.01); *Y02T 10/7005* (2013.01); *Y02T 10/7044* (2013.01); *Y02T 10/7061* (2013.01); *Y02T 10/7072* (2013.01); *Y02T 10/7077* (2013.01); *Y02T 10/7216* (2013.01); *Y02T 10/7241* (2013.01); *Y02T 90/127* (2013.01); *Y02T 90/14* (2013.01)

(58) Field of Classification Search
  CPC .... B60K 2001/0422; B60K 2001/0433; B60L 11/1851; B60L 11/1853
  See application file for complete search history.

(56) References Cited

U.S. PATENT DOCUMENTS

| | | | | |
|---|---|---|---|---|
| 4,690,478 A | * | 9/1987 | Rahrig | H01R 13/521 439/271 |
| 5,187,328 A | * | 2/1993 | Burgess | G01P 1/023 174/564 |
| 5,390,754 A | * | 2/1995 | Masuyama | B60K 1/04 105/51 |
| 2006/0173586 A1 | * | 8/2006 | Swanson | B60H 1/00378 701/1 |
| 2009/0205897 A1 | * | 8/2009 | Endo | B60K 1/04 180/315 |
| 2010/0114762 A1 | * | 5/2010 | Ishii | B60L 11/1803 705/40 |
| 2010/0177543 A1 | * | 7/2010 | DeDona | B60R 11/00 363/145 |
| 2010/0315043 A1 | * | 12/2010 | Chau | B60L 3/0046 320/134 |
| 2011/0044005 A1 | * | 2/2011 | Wetzel | H05K 5/0082 361/714 |
| 2012/0146386 A1 | * | 6/2012 | Rowlands | B60L 7/003 298/2 |
| 2012/0312610 A1 | * | 12/2012 | Kim | H01M 2/1077 180/65.31 |
| 2013/0078498 A1 | * | 3/2013 | Favaretto | B60K 1/04 429/158 |
| 2013/0112491 A1 | * | 5/2013 | Suzuki | B60K 1/02 180/65.21 |
| 2013/0113290 A1 | * | 5/2013 | Sato | B60L 3/0046 307/80 |
| 2013/0119934 A1 | * | 5/2013 | Suzuki | H02J 7/0063 320/112 |
| 2013/0205560 A1 | * | 8/2013 | Ghannam | B60R 16/0239 29/426.5 |
| 2013/0264975 A1 | * | 10/2013 | Kaita | B60L 11/1853 318/139 |
| 2014/0091085 A1 | * | 4/2014 | Yuasa | B60R 16/0239 220/4.26 |

FOREIGN PATENT DOCUMENTS

| | | |
|---|---|---|
| JP | 2012-176751 | 9/2012 |
| JP | 2013-147044 | 8/2013 |
| WO | WO 2013/030884 | 3/2013 |

* cited by examiner

VEHICLE

CROSS-REFERENCE TO RELATED APPLICATIONS

The present application claims priority under 35 U.S.C. §119 to Japanese Patent Application No. 2014-069219, filed Mar. 28, 2014, entitled "Vehicle." The contents of this application are incorporated herein by reference in their entirety.

BACKGROUND

1. Field

The present disclosure relates to a vehicle.

2. Description of the Related Art

In recent years, battery electric vehicles (BEV) that have a motor driven solely by electric power provided by a battery are being developed. For example, Japanese Unexamined Patent Application Publication No. 2012-176751 discloses an electric vehicle that has a plurality of batteries installed underneath a floor panel of the vehicle and has one junction box connecting the batteries to electrical apparatuses.

Another example of known electric vehicles is a hybrid electric vehicle (HEV). An HEV achieves high fuel efficiency by using a motor at the time of start and switching the power source to an engine when it reaches a speed at which the engine is driven efficiently. For example, Japanese Unexamined Patent Application Publication No. 2013-147044 discloses an HEV that has a drive battery, a battery for an auxiliary machine, and one joint box connected to the drive battery and the battery for the auxiliary machine.

Furthermore, a fuel-cell electric vehicle (FCEV), which drives a motor not by using an energy resource like petroleum but by using electric power resulting from electrode reaction between hydrogen and oxygen and, thus, is environmentally friendly, is also being developed. For example, Japanese Unexamined Patent Application Publication No. 2009-190438 discloses an FCEV that has a fuel cell and a power controller unit for controlling electric power to be supplied to a motor.

SUMMARY

According to one aspect of the present invention, a vehicle includes a body, a first battery set, a first accessory device, a second battery set, a second accessory device, a load device, and connecting wires. The first battery set is installed in the body and includes at least one series unit that is formed of a predetermined number of battery cells connected in series. The first accessory device is installed in the body and is connected to the first battery set. The second battery set is installed in the body and includes at least one series unit. The second accessory device is installed in the body and is connected to the second battery set. The load device is installed in the body and is connected to the first battery set via the first accessory device and to the second battery set via the second accessory device. The connecting wires connect the first accessory device and the second accessory device so as to connect the at least one series unit of the first battery set and the at least one series unit of the second battery set in parallel.

According to another aspect of the present invention, a vehicle includes a body, a first battery set, a first accessory device, a second battery set, a second accessory device, a load device, and connecting wires. The first battery set is installed in the body and includes at least one first series unit including a predetermined number of battery cells connected in series. The first accessory device is installed in the body and connected to the first battery set. The second battery set is installed in the body and includes at least one second series unit including a predetermined number of battery cells connected in series. The second accessory device is installed in the body and connected to the second battery set. The load device is installed in the body and connected to the first battery set via the first accessory device and to the second battery set via the second accessory device. The connecting wires connect the first accessory device and the second accessory device so as to connect the at least one first series unit of the first battery set and the at least one second series unit of the second battery set in parallel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 3A and 3B illustrate the arrangement of the first battery pack and the second battery pack, wherein FIGS. 3A and 3B are a side view and a plan view, respectively.

FIGS. 4A and 4B illustrate an example in which the first battery pack is installed in another type of vehicle, wherein FIG. 4A shows the system configuration of another type of vehicle, and FIG. 4B shows the configuration of the first battery pack.

FIGS. 5A and 5B illustrate a comparative example, wherein FIG. 5A shows the configuration of a battery pack installed in a vehicle according to the comparative example, and FIG. 5B shows a case where the battery pack shown in FIG. 5A is installed in another type of vehicle.

DESCRIPTION OF THE EMBODIMENTS

The embodiments will now be described with reference to the accompanying drawings, wherein like reference numerals designate corresponding or identical elements throughout the various drawings.

An embodiment of the present application will be described in detail below with reference to the drawings. An exemplary case where a vehicle V (see FIG. 1) is a BEV, which is powered by a battery, will be described.

Embodiment

Configuration of Vehicle

Figure 1:
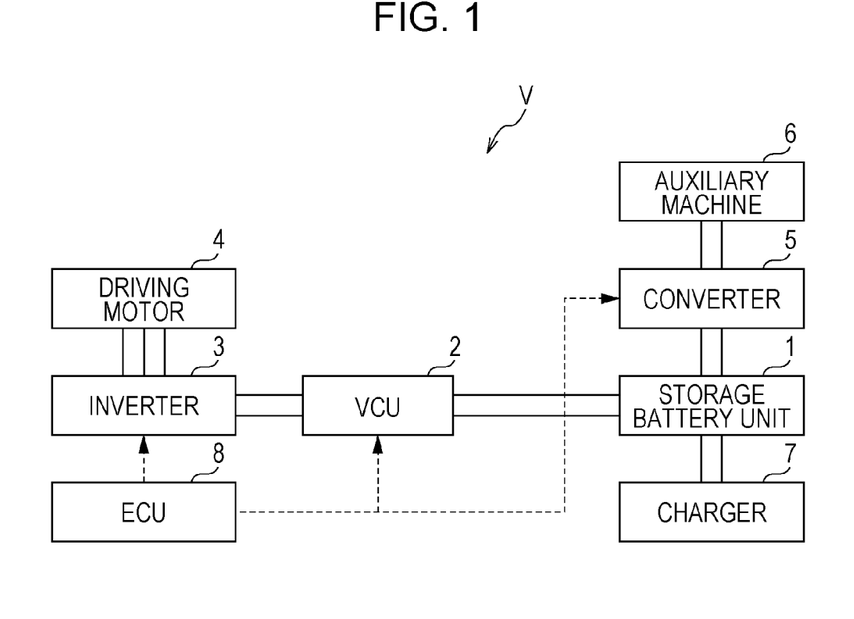
FIG. 1 illustrates the system configuration of a vehicle according to an embodiment of the present application.
Figure 3A:
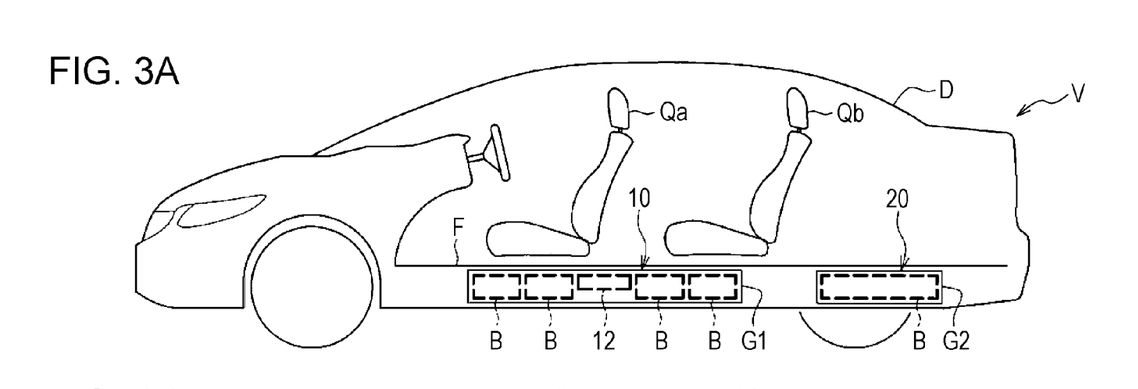
Figure 3B:
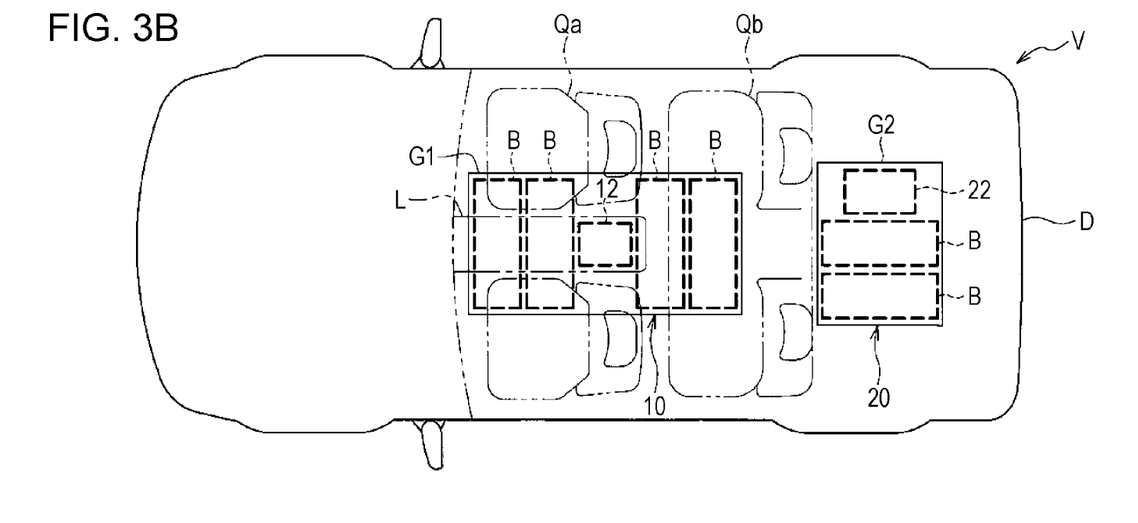

FIG. 1 illustrates the system configuration of a vehicle according to this embodiment. The vehicle V includes a body D (see FIG. 3), a storage battery unit 1, a voltage control unit (VCU) 2, an inverter 3, a driving motor 4, a converter 5, an auxiliary machine 6, a charger 7, and an electric control unit (ECU) 8. The body D (see FIG. 3) forms the outer shape of the vehicle V and accommodates the storage battery unit 1, the VCU 2, the inverter 3, the driving motor 4, the converter 5, the auxiliary machine 6, the charger 7, the ECU 8, etc.

The storage battery unit 1 is charged with electric power supplied from an external power supply (not shown) via the charger 7 or electric power supplied from the driving motor 4 (generator) when regenerative braking is used, and it discharges the charged electric power in response to the operation of the VCU 2 and the converter 5. A detailed description of the storage battery unit 1 will be given below. The VCU 2 controls charging and discharging of the storage battery unit 1 according to instructions from the ECU 8. The inverter 3 converts direct-current power supplied from the storage battery unit 1 via the VCU 2 into three-phase alternating-current power and outputs the three-phase alternating-current power to the driving motor 4. The inverter 3 also converts the three-phase alternating-current power supplied from the driving motor 4 during regenerative braking into direct-current power and outputs the direct-current power to the storage battery unit 1.

The driving motor 4 (load device) is, for example, a synchronous motor and is driven by electric power supplied via the inverter 3. The converter 5 is a DC-to-DC converter that reduces the voltage of the storage battery unit 1. The auxiliary machine 6 (load device) is, for example, an air conditioner (not shown) or a car navigation system (not shown) and is driven by electric power supplied via the converter 5. The ECU 8 integrally controls the operation of the VCU 2, the inverter 3, and the converter 5.

Configuration of Storage Battery Unit

Figure 2:
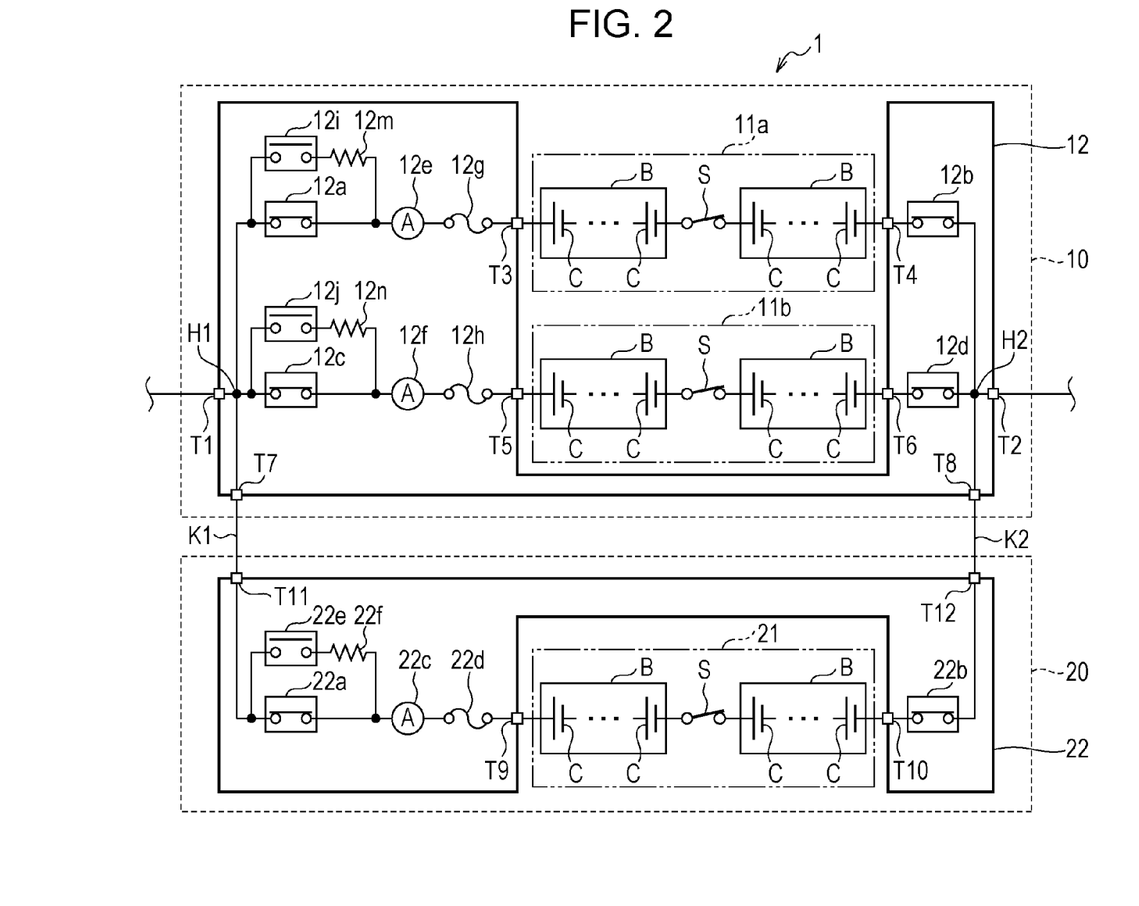
FIG. 2 illustrates the configuration of a first battery pack and a second battery pack of the vehicle.

FIG. 2 illustrates the configuration of a first battery pack and a second battery pack of the vehicle. The storage battery unit 1 includes a first battery pack 10 and a second battery pack 20. The first battery pack 10 and the second battery pack 20 are connected to the VCU 2 (see FIG. 1), the converter 5, and the charger 7 via terminals T1 and T2.

First Battery Pack

The first battery pack 10 includes series units 11a and 11b and a junction board 12. The series unit 11a includes a predetermined number of battery cells C that are connected in series. An example of the battery cells C is a lithium-ion storage cell. In the example shown in FIG. 2, the series unit 11a is formed of cell blocks B and B connected in series via a switch S. Each cell block B includes a plurality of battery cells C connected in series. The other series unit 11b has the same configuration as the series unit 11a. A "first battery set", which includes at least one series unit that is formed of a predetermined number of battery cells C connected in series, includes the series units 11a and 11b.

The series units 11a and 11b have the same number of battery cells C and have substantially the same voltage. As will be described below, the series units 11a and 11b are connected in parallel via the junction board 12. Hence, the voltages of the series units 11a and 11b are the same.

The junction board 12 (first accessory device) serves to connect the series units 11a and 11b in parallel and to switch between connection and disconnection of the load device (the driving motor 4 and the auxiliary machine 6, see FIG. 1) and the series units 11a and 11b. The junction board 12 is connected to a positive terminal of the series unit 11a via a terminal T3 and to a negative terminal of the series unit 11a via a terminal T4. The junction board 12 is also connected to the series unit 11b via terminals T5 and T6.

The junction board 12 has main contactors 12a, 12b, 12c, and 12d, current sensors 12e and 12f, fuses 12g and 12h, pre-charge contactors 12i and 12j, and pre-charge resistors 12m and 12n. As shown in FIG. 2, the main contactor 12a, the current sensor 12e, the fuse 12g, the series unit 11a, and the main contactor 12b are sequentially connected in series. The pre-charge contactor 12i and the pre-charge resistor 12m, connected to each other in series, are connected in parallel to the main contactor 12a.

The main contactors 12a and 12b (first contactor) are, for example, electromagnetic switches and serve to connect or disconnect between the series unit 11a and the VCU 2 (see FIG. 1), the converter 5, and the charger 7. The main contactors 12a and 12b switch the connection and disconnection in accordance with an instruction from the ECU 8 (see FIG. 1). In a normal use state, the main contactors 12a and 12b are on.

The current sensor 12e detects a charging or discharging current of the series unit 11a and outputs the detected value to the ECU 8 (see FIG. 1). The fuse 12g protects the series unit 11a and the devices on the junction board 12 by blowing when a current exceeding the rated current runs through it.

The pre-charge contactor 12i and the pre-charge resistor 12m are provided to reduce the current flowing through the series unit 11a immediately after the start of charging or discharging. For example, the ECU 8 (see FIG. 1) connects the pre-charge contactor 12i immediately after the start of charging or discharging. As a result, a current flows through the pre-charge resistor 12m, reducing the current flowing to the series unit 11a. Then, the main contactor 12a is connected, and the charging or discharging of the series unit 11a is continued while the pre-charge contactor 12i is disconnected.

The main contactor 12c, the current sensor 12f, the fuse 12h, the series unit 11b, and the main contactor 12d are sequentially connected in series, and the pre-charge contactor 12j and the pre-charge resistor 12n are connected in parallel to the main contactor 12c. Because the configuration of these devices is the same as that of the devices on the series unit 11a, a description thereof will be omitted.

As shown in FIG. 2, the series units 11a and 11b are connected in parallel, and a connection point therebetween on the positive side, H1, is connected to the terminals T1 and T7, and a connection point therebetween on the negative side, H2, is connected to the terminals T2 and T8. The cell blocks B of the series units 11a and 11b and the junction board 12 are accommodated in a plastic housing G1 (see FIG. 3).

Second Battery Pack

The second battery pack 20 shown in FIG. 2 includes a series unit 21 and a junction board 22. The series unit 21 is formed of cell blocks B and B connected in series via a switch S. Each cell block B includes a plurality of battery cells C connected in series. The number of battery cells C in the series unit 21 is the same as the number of battery cells C in the series units 11a and 11b of the first battery pack 10. A "second battery set", which includes at least one series unit that is formed of a predetermined number of battery cells C connected in series, includes the series unit 21.

The junction board 22 (second accessory device) serves to switch between connection and disconnection of the series unit 21 and the load device (the driving motor 4 and the auxiliary machine 6, see FIG. 1). The junction board 22 is connected to a positive terminal of the series unit 21 via a terminal T9 and to a negative terminal of the series unit 21 via a terminal T10.

The junction board 22 has main contactors 22a and 22b (second contactors), a current sensor 22c, a fuse 22d, a pre-charge contactor 22e, and a pre-charge resistor 22f. The main contactor 22a, the current sensor 22c, the fuse 22d, the series unit 21, and the main contactor 22b are sequentially connected in series. The positive side of the circuit including the above-mentioned devices is connected to the terminal T7 of the junction board 12 via a terminal T11 and a connecting wire K1. The negative side of the circuit is connected to a terminal T8 of the junction board 12 via a terminal T12 and a connecting wire K2.

The pre-charge contactor 22e and the pre-charge resistor 22f, connected to each other in series, is connected in parallel to the main contactor 22a. The configuration of these devices is the same as the configuration of the devices connected to the series units 11a and 11b of the first battery pack 10, so, a description thereof will be omitted. The cell blocks B of the series unit 21 and the junction board 22 are accommodated in a plastic housing G2 (see FIG. 3).

Connecting Wire

The connecting wire K1 on the positive side connects the terminal T7 on the junction board 12 and the terminal T11 on the junction board 22. The connecting wire K2 on the negative side connects the terminal T8 on the junction board 12 and the terminal T12 on the junction board 22. By connecting the connecting wires K1 and K2 to the junction boards 12 and 22, the series units 11a and 11b of the first battery pack 10 and the series unit 21 of the second battery pack 20 are connected in parallel.

The driving motor 4 (see FIG. 1) and the auxiliary machine 6, which serve as the "load devices", are connected to the series units 11a and 11b (first battery set) via the junction board 12, etc. and to the series unit 21 (second battery set) via the junction board 22, etc.

Arrangement of Battery Pack

FIGS. 3A and 3B illustrate the arrangement of the first battery pack and the second battery pack. In FIGS. 3A and 3B, illustration of wires connecting the cell blocks B and the junction boards 12 and 22 is omitted. In the example shown in FIGS. 3A and 3B, the first battery pack 10 is formed of four horizontally arranged cell blocks B and the junction board 12 accommodated in the plastic housing G1. The second battery pack 20 is formed of two horizontally arranged cell blocks B and the junction board 22 accommodated in the plastic housing G2. The arrangement of the cell blocks B and the junction boards 12 and 22 may be appropriately changed.

The first battery pack 10 is disposed below a floor panel F (at around the center as viewed from above) of the vehicle V. Because the first battery pack 10 has a larger number of cell blocks B than the second battery pack 20, the volume thereof is larger than that of the second battery pack 20. Therefore, it is desirable that the first battery pack 10 be disposed below the floor panel F, where a relatively large space is ensured in the vehicle V.

The junction board 12 is often installed in a frame (not shown) constituting a center console L (shown schematically in FIG. 3B) and extending in a front-rear direction. In this embodiment, because the junction board is divided into two (junction boards 12 and 22), the longitudinal and transverse widths of the junction board 12 can be reduced, compared with a case where one junction board corresponding to the series units 11a, 11b, and 21 is provided. Thus, there is no need to increase the transverse width of the center console L in accordance with the size of the junction board 12, ensuring a sufficient transverse width for a front seat Qa, improving the comfort of an occupant.

The second battery pack 20 is disposed below the floor panel F, at a position behind a rear seat Qb. Because the second battery pack 20 includes a relatively small number of cell blocks B, a sufficient space for the second battery pack 20 is ensured even behind the rear seat Qb.

In another type of vehicle (for example, an FCEV), a tank (not shown) filled with fuel gas is often disposed behind the rear seat. Although a detailed description will be given below, for example, when only the first battery pack 10 is installed in another type of vehicle (i.e., when the first battery pack 10 is shared with another type of vehicle) without changing the configuration, it is only necessary that a tank is installed instead of the second battery pack 20. There is no need to change the configuration and arrangement of the first battery pack 10. Hence, it is possible to share the first battery pack 10 between the vehicle V according to this embodiment and another type of vehicle, reducing the manufacturing cost of these vehicles.

Exemplary Installation in Another Type of Vehicle

Figure 4A:
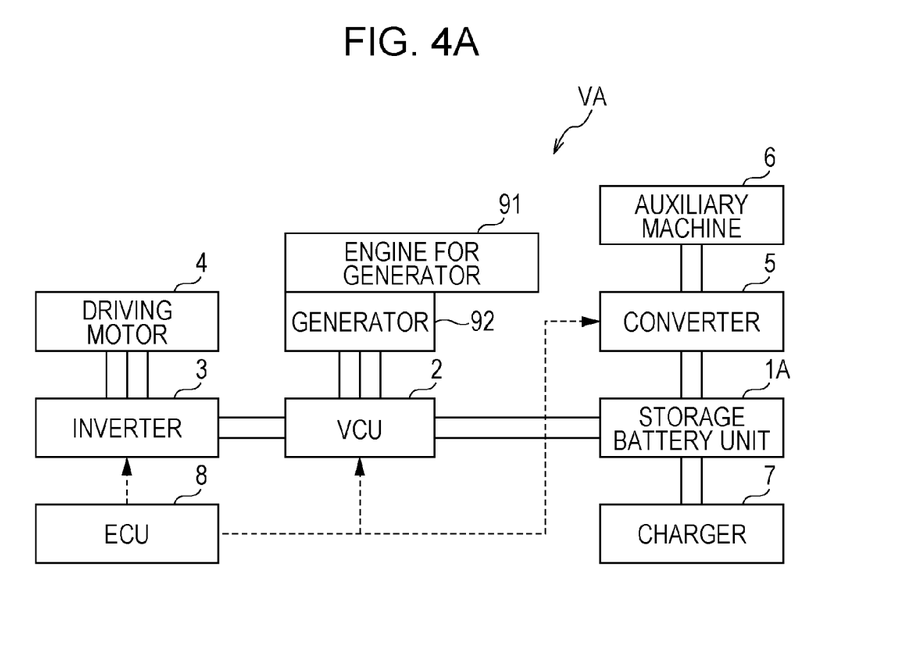

An exemplary case where the first battery pack 10 is installed in an REV, serving as another type of vehicle VA, will be described. As shown in FIG. 4A, in another type of vehicle VA, an engine for generator 91 and a generator 92 connected to the engine for generator 91 are provided in addition to the configuration of the vehicle V (BEV) according to this embodiment, and a storage battery unit 1A includes the first battery pack 10 (see FIG. 4B). Although a detailed description will be omitted, when the first battery pack 10 is running out of power, the engine for generator 91 is driven to make the generator 92 generate power and charge the series units 11a and 11b (see FIG. 4) of the storage battery unit 1A with the generated power.

Figure 4B:
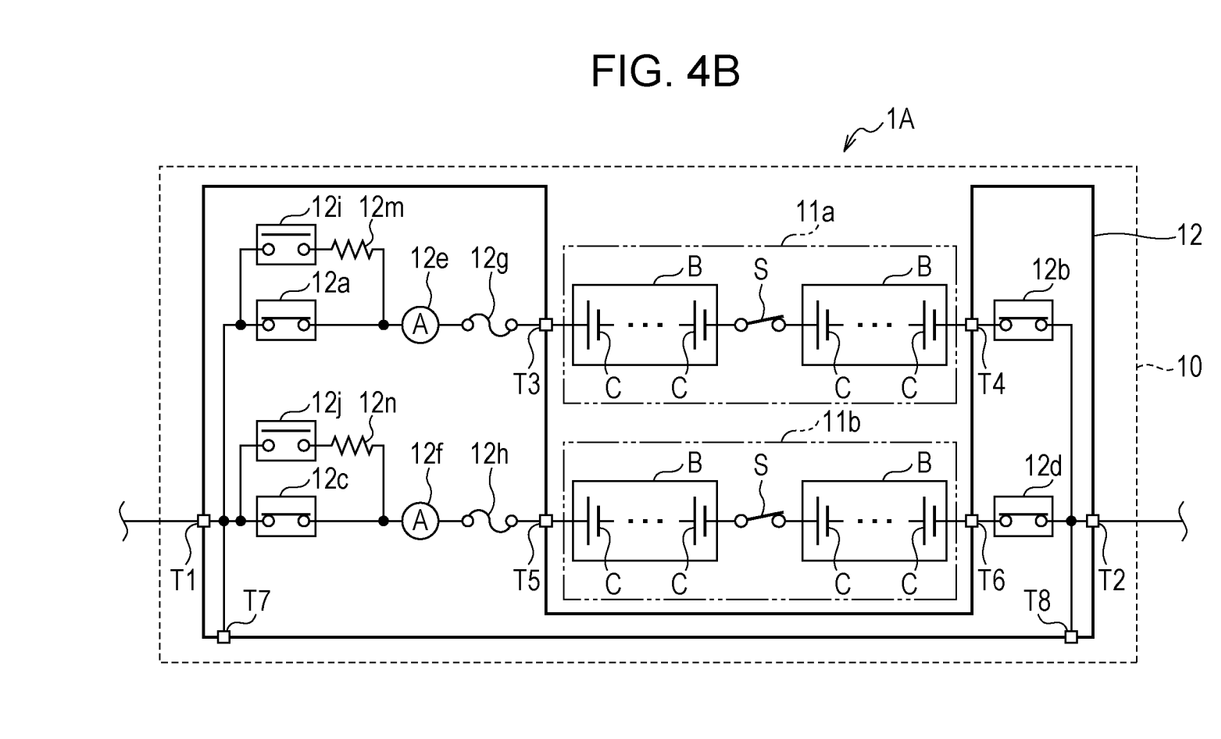

As shown in FIG. 4B, the storage battery unit 1A of another type of vehicle VA includes the first battery pack 10. That is, the storage battery unit 1A has the same configuration as the storage battery unit 1 (see FIG. 2) of the vehicle V (see FIG. 1) according to this embodiment but without the second battery pack 20. Because the REV has the engine for generator 91 and the generator 92, the charging capacity of the storage battery unit 1A may be smaller than that of a BEV, which does not have the engine for generator 91 and the generator 92.

Furthermore, in this embodiment, the charging capacity required by the vehicle V (three series units 11a, 11b, and 21) is divided into the charging capacity required by another type of vehicle VA (two series units 11a and 11b) and the remaining charging capacity (one series unit 21), and two junction boards 12 and 22 are provided correspondingly. This enables the series units 11a and 11b and the junction board 12 of the vehicle V according to this embodiment to be used in another type of vehicle VA without changing the configuration. That is, it is possible to share the series units 11a and 11b and the junction board 12 between the vehicle V according to this embodiment and another type of vehicle VA, reducing the manufacturing cost of the vehicles V and VA.

Although FIGS. 4A and 4B show the example in which the first battery pack 10 is installed in another type of vehicle VA without changing the configuration, the vehicles V and VA may have different number of cell blocks B in the series units 11a and 11b, while using the same junction board 12.

Advantage

In the vehicle V according to this embodiment, by forming the first battery pack 10 so as to be suitable for use in another type of vehicle VA (for example, an REV) that requires a smaller charging capacity than the vehicle V, serving as a BEV, the series units 11a and 11b and the junction board 12 can be shared between the vehicle V and the vehicle VA. Thus, the series unit and the junction board can be mass-produced, reducing the manufacturing cost of the vehicles V and VA, compared with a case where the series unit and the junction board suitable only for the vehicle V according to this embodiment are produced.

Figure 5A:
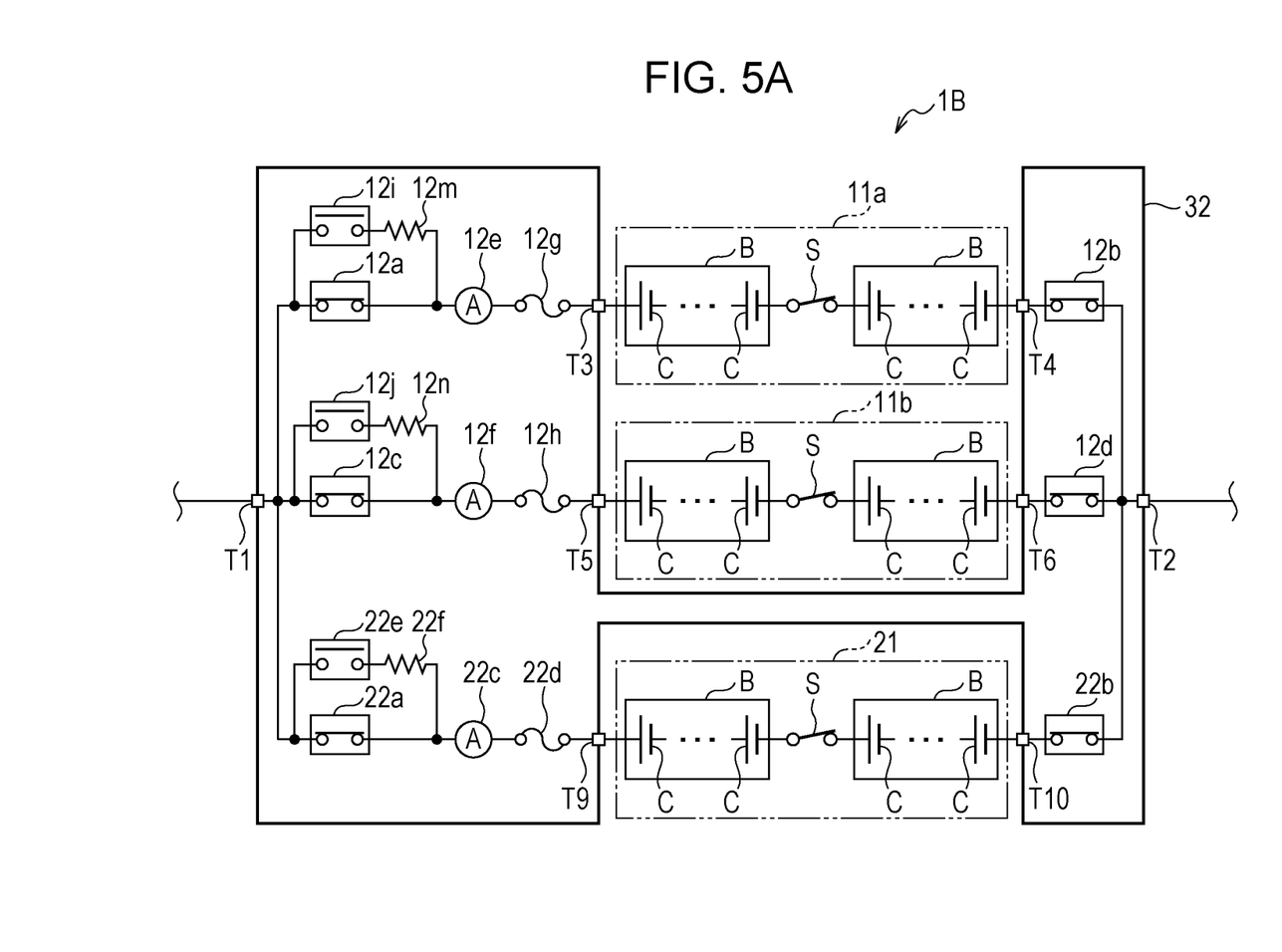

As shown in a comparative example in FIG. 5A, in a conventional BEV, for example, three series units 11a, 11b, and 21 are connected to one junction board 32. Because the junction board 32 is custom-made in accordance with the charging capacity of the vehicle, the junction board 32 cannot be shared with another type of vehicle. In particular, because the number of production of BEVs is smaller than that of HEVs, etc., the use of a junction board designed specially for BEVs will result in an increase in manufacturing cost.

Figure 5B:
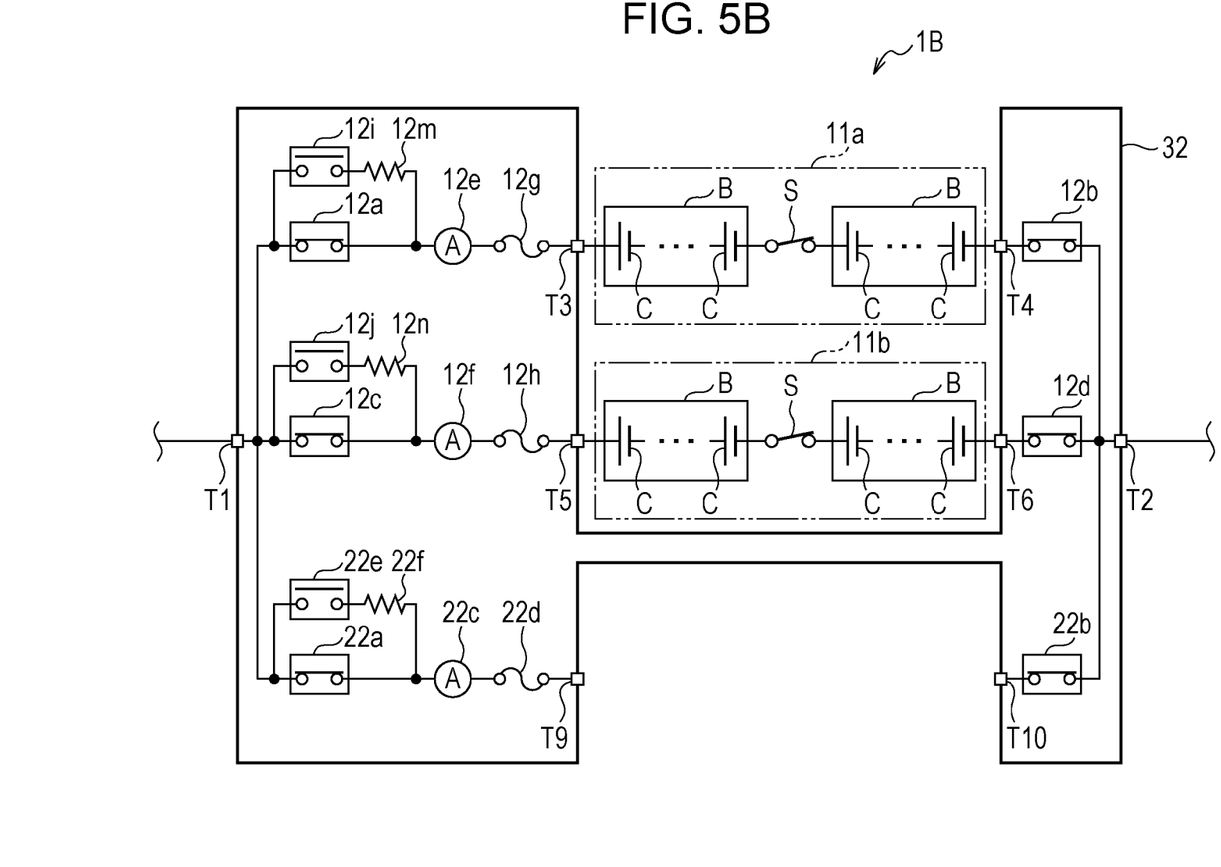

FIG. 5B shows a configuration of the junction board 32 shown in FIG. 5A when used in an REV without changing the configuration. The REV does not require the main contactors 22a and 22b, the current sensor 22c, the fuse 22d, the pre-charge contactor 22e, or the pre-charge resistor 22f shown in FIG. 5B. In particular, the main contactors 22a and 22b and the pre-charge contactor 22e are more expensive than the other devices, and the use of these devices is waste of manufacturing cost.

In contrast, in the vehicle V according to this embodiment, the series units 11a and 11b (see FIG. 2) and the junction board 12 are configured in accordance with the charging capacity of another type of vehicle VA, and the shortfall in charging capacity is compensated for by the series unit 21 and the junction board 22. This enables to share the series units 11a and 11b and the junction board 12 between the vehicles V and VA, which have different power plants. As a result, it is possible to mass-produce the common devices, namely, the series units 11a and 11b and the junction board 12, reducing the manufacturing cost of the vehicles V (BEVs), which are relatively small in number of production.

Furthermore, in this embodiment, unlike the comparative example shown in FIG. 5B, the devices including the main contactors 22a and 22b and the pre-charge contactor 22e are efficiently utilized. In particular, by efficiently utilizing the contactors, which are relatively expensive, heavy, and large devices, the manufacturing cost can be drastically reduced, and the installation space for the storage battery unit 1 and 1A can be reduced to a minimum, compared with the conventional configuration.

Moreover, because the junction board 12 shown in FIG. 2 is connected to a smaller number of series units 11a and 11b than the junction board according to the comparative example shown in FIG. 5A, the longitudinal and transverse widths of the junction board 12 can be reduced correspondingly. Accordingly, there is no need to increase the transverse width of the center console L (see FIG. 3B) corresponding to the size of the junction board 12, providing a sufficient installation space for the front seat Qa (see FIG. 3B).

Modification

Although the vehicle V of the present application has been described according to the above-described embodiment, the present application is not limited to the description above, but may be modified in various ways. Although a configuration in which the first battery pack 10, among the first battery pack 10 and the second battery pack 20 to be installed in the vehicle V, is configured such that it can be installed in an REV has been discussed in the above embodiment, the possible configurations are not limited thereto. For example, the second battery pack 20 may be installed, without changing the configuration, in another type of vehicle, such as an FCEV or an HEV, having a relatively small battery charging capacity. In other words, the second battery pack 20 may be configured so as to be suitable for use in another type of vehicle, and the shortfall of the charging capacity may be compensated for by the first battery pack 10. By doing so, the second battery pack 20 may be shared between the vehicle V according to this embodiment and another type of vehicle.

Furthermore, it is possible to configure such that the first battery pack 10 can be installed in an REV and the second battery pack 20 can be installed in an FCEV or an HEV. By doing so, the series units 11a, 11b, and 21 and the junction boards 12 and 22 can be shared among wide variety of vehicles, reducing the manufacturing cost of these vehicles.

Although a configuration in which the first battery pack 10 includes two series units, 11a and 11b, and the second battery pack 20 includes one series unit, 21, has been discussed in the above embodiment, the possible configurations are not limited thereto. For example, the number of series units in the first battery pack 10 and second battery pack 20 may be appropriately changed, and the circuit configuration of the junction boards 12 and 22 may be changed correspondingly. For example, the first battery pack 10 and the second battery pack 20 may have the same number of series units.

Although a configuration in which the "accessory device" connected to the series unit (for example, the series units 11a and 11b, see FIG. 2) is the junction board (for example, the junction board 12, see FIG. 2) has been described in the above embodiment, the possible configurations are not limited thereto. For example, a first converter (not shown) may be installed instead of the junction board 12, and a second converter (not shown) may be installed instead of the junction board 22. In such a case, the first converter charges or discharges the series units 11a and 11b in accordance with an instruction from the ECU 8. Furthermore, the second converter charges or discharges the series unit 21 in accordance with an instruction from the ECU 8.

Although a configuration in which the series units 11a and 11b and the junction board 12 are accommodated in the single housing, G1, to form the first battery pack 10 has been described in the above embodiment, the possible configurations are not limited thereto. For example, the series units 11a and 11b may be accommodated in the housing G1 and installed below the floor panel of the vehicle V, and the junction board 12 may be installed outside the housing G1. This configuration may also be applied to the second battery pack 20.

Although a configuration in which the first battery pack 10 is installed below the floor panel of the vehicle V and the second battery pack 20 is installed behind the rear seat Qb has been described in the above embodiment, the position of installation of the first battery pack 10 and the second battery pack 20 may be appropriately changed. Furthermore, although a configuration in which the vehicle V is a BEV has been described in the above embodiment, the possible configurations are not limited thereto. For example, the vehicle V may be an FCEV, and one or both of two battery packs installed in this FCEV may be configured so as to be shared with another type of vehicle.

A vehicle of the present application includes a body; a first battery set that is installed in the body and includes at least one series unit that is formed of a predetermined number of battery cells connected in series; a first accessory device that is installed in the body and is connected to the first battery set; a second battery set that is installed in the body and includes at least one series unit; a second accessory device that is installed in the body and is connected to the second battery set; a load device that is installed in the body and is connected to the first battery set via the first accessory device and to the second battery set via the second accessory device; and connecting wires that connect the first accessory device and the second accessory device so as to connect the at least one series unit of the first battery set and the at least one series unit of the second battery set in parallel.

In this configuration, the first battery set is connected to the load device via the first accessory device, and the second battery set is connected to the load device via the second accessory device. Thus, for example, by configuring the first battery set and the first accessory device so as to be suitable for use in another type of vehicle that has a smaller charging capacity than the vehicle of the present application, the first battery set and the first accessory device can be used in (i.e., shared with) another type of vehicle without changing the configuration. Thus, the first battery set and the first accessory device can be mass-produced, reducing the manufacturing cost thereof, compared with a case where the battery set and the accessory device suitable only for the vehicle according to the present application are produced. The same applies to a case where the second battery set and the second accessory device are to be shared with another type of vehicle. That is, the present application increases the compatibility of devices, such as the first battery set, the first accessory device, the second battery set, and the second accessory device, among vehicles having different power plants. Accordingly, it is possible to reduce the manufacturing cost of the vehicle according to the present application, as well as the other type of vehicles.

It is desirable that the number of series units in the first battery set be greater than the number of series units in the second battery set.

In this configuration, the number of series units in the first battery set is greater than the number of series units in the second battery set. This configuration enables the first battery set, which includes a relatively large number of series units, and the first accessory device connected thereto to be installed, without changing the configuration, in another type of vehicle, such as a range extender electric vehicle (REV), that requires a relatively large charging capacity. By enabling the first battery set and the first accessory device to be used in another type of vehicle without changing the configuration, mass-production of these devices becomes possible, reducing the manufacturing cost of the vehicles.

Furthermore, the second battery set, which includes a relatively small number of series units, and the second accessory device connected thereto can be installed, without changing the configuration, in another type of vehicle, such as an FCEV or an HEV, that requires a relatively small charging capacity. By enabling the second battery set and the second accessory device to be used in another type of vehicle without changing the configuration, mass-production of these devices becomes possible, reducing the manufacturing cost of the vehicles.

Furthermore, it is desirable that the first battery set be disposed below a floor panel of the vehicle and that the second battery set be disposed behind a rear seat.

In this configuration, the first battery set, which includes a relatively large number of series units (and hence, has a large volume), can be disposed below the floor panel of the vehicle, where a large installation space is ensured. Furthermore, by disposing the second battery set behind the rear seat, where a fuel tank is often disposed, the compatibility with another type of vehicle can be increased, thus reducing the manufacturing cost of the vehicles.

Furthermore, it is desirable that the first accessory device include a first contactor that switches between connection and disconnection between the first battery set and the load device, and the second accessory device include a second contactor that switches between connection and disconnection between the second battery set and the load device.

In this configuration, the first accessory device includes the first contactor, and the second accessory device includes the second contactor. Hence, for example, by installing the first battery set and the first accessory device in another type of vehicle without changing the configuration, the contactor, which is a relatively expensive, heavy, and large device, can be efficiently utilized, thus reducing the manufacturing cost of the vehicles.

The present application provides vehicles that can be manufactured at low cost.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
   a body;
   a first battery set that is installed in the body and includes a plurality of series units that are each formed of a predetermined number of battery cells connected in series;
   a first accessory device that is installed in a first housing in the body and is connected to each of the series units of the first battery set by pairs of series unit terminals that respectively correspond to each of the series units, the first accessory device including a load device terminal and a first terminal in the first housing;
   a second battery set that is installed in the body and includes at least one series unit;
   a second accessory device that is installed in a second housing in the body and is connected to the second battery set, the second accessory device including a second terminal in the second housing;
   a load device that is installed in the body and is connected to the first battery set via the load device terminal of the first accessory device and to the second battery set via the second accessory device; and
   connecting wires that connect the first accessory device and the second accessory device so as to connect the series units of the first battery set and the at least one series unit of the second battery set in parallel, one of the connecting wires connecting the first terminal of the first accessory device and the second terminal of the second accessory device, the first accessory device and the second accessory device being connected in parallel, wherein
   the plurality of series units of the first battery set includes two series units each of which comprises a predetermined number of battery cells connected in series, and
   the first accessory device connects the two series units of the first battery set to each other in parallel.

2. The vehicle according to claim 1, wherein the number of series units in the first battery set is greater than the number of series units in the second battery set.

3. The vehicle according to claim 2, wherein
   the first battery set is disposed below a floor panel of the vehicle, and
   the second battery set is disposed behind a rear seat.

4. The vehicle according to claim 1, wherein
   the first accessory device includes a first contactor that switches between connection and disconnection between the first battery set and the load device, and
   the second accessory device includes a second contactor that switches between connection and disconnection between the second battery set and the load device.

5. The vehicle according to claim 2, wherein
   the first accessory device includes a first contactor that switches between connection and disconnection between the first battery set and the load device, and the second accessory device includes a second contactor that switches between connection and disconnection between the second battery set and the load device.

6. The vehicle according to claim 3, wherein
the first accessory device includes a first contactor that switches between connection and disconnection between the first battery set and the load device, and
the second accessory device includes a second contactor that switches between connection and disconnection between the second battery set and the load device.

7. The vehicle according to claim 1, wherein
the first accessory device is disposed below a floor panel of the vehicle, and
the second accessory device is disposed behind a rear seat.

8. The vehicle according to claim 1,
wherein the first battery set is operable to provide power or to receive power via the first accessory device when the one of the connecting wires is disconnected from the first and second terminals.

9. The vehicle according to claim 1, wherein
an entirety of the batteries for providing electric power to the load device are collectively disposed in the first housing and the second housing.

10. A vehicle comprising:
a body;
a first battery set installed in the body and including a plurality of first series units each comprising a predetermined number of battery cells connected in series;
a first accessory device installed in a first housing in the body and connected to each of the plurality of first series units of the first battery set by pairs of series unit terminals that respectively correspond to each of the first series units, the first accessory device including a load device terminal and a first terminal in the first housing;
a second battery set installed in the body and including at least one second series unit comprising a predetermined number of battery cells connected in series;
a second accessory device installed in a second housing in the body and connected to the second battery set, the second accessory device including a second terminal in the second housing;
a load device installed in the body and connected to the first battery set via the load device terminal of the first accessory device and to the second battery set via the second accessory device; and
connecting wires which connect the first accessory device and the second accessory device so as to connect the first series units of the first battery set and the at least one second series unit of the second battery set in parallel, one of the connecting wires connecting the first terminal of the first accessory device and the second terminal of the second accessory device, the first accessory device and the second accessory device being connected in parallel, wherein
the first series units includes two first series units each of which comprises a predetermined number of battery cells connected in series, and
the first accessory device connects the two first series units to each other in parallel.

11. The vehicle according to claim 10, wherein a total number of the first series units in the first battery set is greater than a total number of the at least one second series unit in the second battery set.

12. The vehicle according to claim 11, wherein
the first battery set is disposed below a floor panel of the vehicle, and
the second battery set is disposed behind a rear seat of the vehicle.

13. The vehicle according to claim 10, wherein
the first accessory device includes a first contactor to be switched between connection and disconnection between the first battery set and the load device, and
the second accessory device includes a second contactor to be switched between connection and disconnection between the second battery set and the load device.

14. The vehicle according to claim 11, wherein
the first accessory device includes a first contactor to be switched between connection and disconnection between the first battery set and the load device, and
the second accessory device includes a second contactor to be switched between connection and disconnection between the second battery set and the load device.

15. The vehicle according to claim 12, wherein
the first accessory device includes a first contactor to be switched between connection and disconnection between the first battery set and the load device, and
the second accessory device includes a second contactor to be switched between connection and disconnection between the second battery set and the load device.

16. The vehicle according to claim 13, wherein
the first contactor and a first one of the first series units of the first battery set are connected in series, and
the second contactor and the at least one second series unit of the second battery set are connected in series.

17. The vehicle according to claim 10, wherein
the first accessory device is disposed below a floor panel of the vehicle, and
the second accessory device is disposed behind a rear seat.

18. The vehicle according to claim 10,
wherein the first battery set is operable to provide power or to receive power via the first accessory device when the one of the connecting wires is disconnected from the first and second terminals.

19. The vehicle according to claim 10, wherein
an entirety of the batteries for providing electric power to the load device are collectively disposed in the first housing and the second housing.

20. A vehicle comprising:
a body;
a first battery set installed in the body and including at least one first series unit comprising a predetermined number of battery cells connected in series;
a second battery set installed in the body and including at least one second series unit comprising a predetermined number of battery cells connected in series;
a load device installed in the body to receive electric power supplied from the first battery unit and the second battery unit;
a first accessory device installed in the body and electrically connected to the first battery set and the load device, the first accessory device comprising:
an electric supply path to connect the first battery set and the load device;
a first switch provided on the electric supply path to switch between connection and disconnection between the first battery set and the load device;
a branched path branched from the electric supply path between the first switch and the load device; and
a first terminal connected to the branched path; and
a second accessory device installed in the body and electrically connected to the second battery set and the load device, the second accessory device comprising:

a second switch to switch between connection and disconnection between the second battery set and the load device; and a second terminal connected to the first terminal via a connecting wire, the at least one first series unit of the first battery set and the at least one second series unit of the second battery set being connected in parallel.

21. The vehicle according to claim 20, wherein the first battery set is disposed below a floor panel of the vehicle, and the second battery set is disposed behind the first battery in the vehicle.

* * * * *